(12) United States Patent
O'Ceallaigh et al.

(10) Patent No.: US 7,317,737 B2
(45) Date of Patent: Jan. 8, 2008

(54) SYSTEMS AND METHODS FOR USING HDLC CHANNEL CONTEXT TO SIMULTANEOUSLY PROCESS MULTIPLE HDLC CHANNELS

(75) Inventors: Ronan D. O'Ceallaigh, Ennis (IE); Daniel G. Borkowski, Lunenburg, MA (US); Niall D. McDonnell, Limerick (IE)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 10/655,565

(22) Filed: Sep. 4, 2003

(65) Prior Publication Data

US 2005/0053083 A1 Mar. 10, 2005

(51) Int. Cl.
*H04J 3/24* (2006.01)
(52) U.S. Cl. .............. 370/474; 370/442; 370/537; 370/412
(58) Field of Classification Search .............. None
See application file for complete search history.

(56) References Cited

U.S. PATENT DOCUMENTS

| 5,619,500 | A | * | 4/1997 | Hiekali | 370/414 |
| 6,195,346 | B1 | * | 2/2001 | Pierson, Jr. | 370/352 |
| 7,007,099 | B1 | * | 2/2006 | Donati et al. | 709/237 |
| 2002/0176449 | A1 | * | 11/2002 | Trippe | 370/505 |

* cited by examiner

*Primary Examiner*—Duc Ho
(74) *Attorney, Agent, or Firm*—Jung-hua Kuo

(57) ABSTRACT

Systems and methods are disclosed for using High-level Data Link Control (HDLC) channel context information to simultaneously process multiple HDLC channels. Preferred embodiments of the present invention enable a single network processing engine to process multiple HDLC channels. The current state of the HDLC channel can be evaluated, stored, and restored, which means that the processing of a channel can be halted, the channel state read and stored, and the state of a different channel written to the processing engine. This allows the engine to begin processing a new channel, and then, at a later stage, restore the state of the original channel and resume processing.

17 Claims, 4 Drawing Sheets

SYSTEMS AND METHODS FOR USING HDLC CHANNEL CONTEXT TO SIMULTANEOUSLY PROCESS MULTIPLE HDLC CHANNELS

BACKGROUND OF THE INVENTION

1. Field of the Invention

The present invention relates generally to data processing and networking. More specifically, systems and methods are disclosed for using High-level Data Link Control (HDLC) channel context information to simultaneously process multiple HDLC channels.

2. Description of Related Art

High-level Data Link Control (HDLC) is a data link protocol that uses a unique bit sequence to delimit the start and end of each frame. In HDLC, frames are delimited by a sequence of bits known as a "flag." The flag sequence is a unique 8-bit sequence of the form 01111110 (0×7e). The data link is always on: when there is no data to send, the link transmits an idle sequence.

The flag sequence should never occur within the content of a frame because it could otherwise be confused with an intentionally sent flag. A technique known as 0-bit insertion or 0-bit stuffing is used to prevent random data from synthesizing a flag. This technique is said to make HDLC transparent since any stream of bits may be present between the open and closing flag of a frame. If, for example, the flag sequence has six consecutive ones, transparency can be achieved by inserting a 0-bit after any sequence of five consecutive ones in the payload. In the receive direction, any sequence of five ones followed by a zero is deemed to have been bit-stuffed, and the zero bit is removed from the incoming bit stream.

An illustrative HDLC frame is shown in FIG. 1. As shown in FIG. 1, in addition to flags 102 and 112 and data section 108, HDLC frames also include a Frame Check Sequence (FCS) 110, which is a cyclic redundancy check calculation over a known polynomial using the unstuffed data in the frame. In addition, HDLC frames typically include address and control information 104, 106.

An application may have multiple logical HDLC connections running simultaneously (usually time-division multiplexed) at a relatively low speed. The device running the application will typically need the ability to terminate these connections, where "terminating" a connection refers to the process of encapsulating or de-encapsulating the data in an HDLC frame. However, conventional HDLC controllers impose limitations on the number of simultaneous HDLC channels that can be processed.

BRIEF DESCRIPTION OF THE DRAWINGS

The present invention will be readily understood by the following detailed description in conjunction with the accompanying drawings, wherein like reference numerals designate like structural element.

DESCRIPTION OF SPECIFIC EMBODIMENTS

Figure 1:
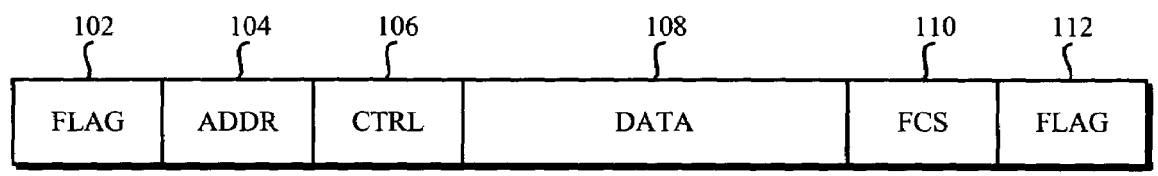
FIG. 1 illustrates a High-level Data Link Control (HDLC) frame.

Systems and methods are disclosed for using High-level Data Link Control (HDLC) channel context information to simultaneously process multiple HDLC channels. Preferred embodiments of the present invention enable a single network processing engine or coprocessor to process multiple HDLC channels, the limit on the number of channels depending on the bandwidth of the HDLC data and the speed of the device.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments are described below.

In one embodiment, a method for processing multiple HDLC channels is provided. Previously stored state information for a first channel is retrieved from storage. This state information is used to resume processing of the first channel where it previously left off. When the network processing engine wishes to process data from another channel, the current state of the first channel is written to storage, and the previous state of the new channel is retrieved. The state information for the new channel is used to resume processing of that channel. In a preferred embodiment, this method is performed by a single HDLC co-processor within a single network processing engine. In addition, in a preferred embodiment the state information includes a frame status bit, a count of the amount of data needed before a currently received frame will be long enough to be valid, a current value of a frame check sequence, a count of the number of consecutive ones received in the currently received frame, a residue of bits that fall outside a predefined byte boundary, and a count of the number of bits in the residue.

In another embodiment, a network processing engine is provided. The network processing engine includes a processor, memory, and computer code stored within the memory for retrieving previously stored state information for a first HDLC channel, using this state information to resume processing of the HDLC channel, writing updated state information for the first HDLC channel to storage, retrieving previously stored state information for a second HDLC channel, and using the retrieved state information to resume processing of the second HDLC channel.

In yet another embodiment, a computer program package is provided which includes instructions that can cause a computer system to retrieve state information for a first HDLC channel and use this state information to resume processing of the channel. The computer program package is further operable to cause the computer system to write updated state information for the first HDLC channel to storage, retrieve previously stored state information for a second HDLC channel, and use this state information to resume processing of the second HDLC channel.

In yet another embodiment, a network processing engine is provided that is configured to encapsulate and de-encapsulate multiple HDLC channels at a time.

In another embodiment, a network processing engine is described. The network processing engine can be configured to obtain multiple, time-division multiplexed channels of HDLC data. The network processing engine accumulates chunks of HDLC data from each channel and passes the chunks to an HDLC coprocessor included within, or coupled to, the network processing engine. The HDLC coprocessor is configured to obtain the chunks of HDLC data and de-encapsulate their contents.

These and other features and advantages of the present invention will be presented in more detail in the following detailed description and the accompanying figures which illustrate by way of example the principles of the invention. The following description is presented to enable any person skilled in the art to make and use the inventive body of work. Descriptions of specific embodiments and applications are provided only as examples, and various modifications will be readily apparent to those skilled in the art. The general principles defined herein may be applied to other embodiments and applications without departing from the spirit and scope of the invention. Thus, the present invention is to be accorded the widest scope, encompassing numerous alternatives, modifications, and equivalents consistent with the principles and features disclosed herein. For purpose of clarity, details relating to technical material that is known in the fields related to the invention have not been described in detail so as not to unnecessarily obscure the present invention.

Preferred embodiments of the present invention enable a single network processing engine to process multiple HDLC channels. Preferred embodiments rely on the fact that the current state of the HDLC channel can be evaluated, stored, and restored, which means that the processing of a channel can be halted, the channel state read and stored, and the state of a different channel written to the processing engine. This allows the engine to begin processing a new channel, and then, at a later stage, restore the state of the original channel and resume processing.

Figure 2:
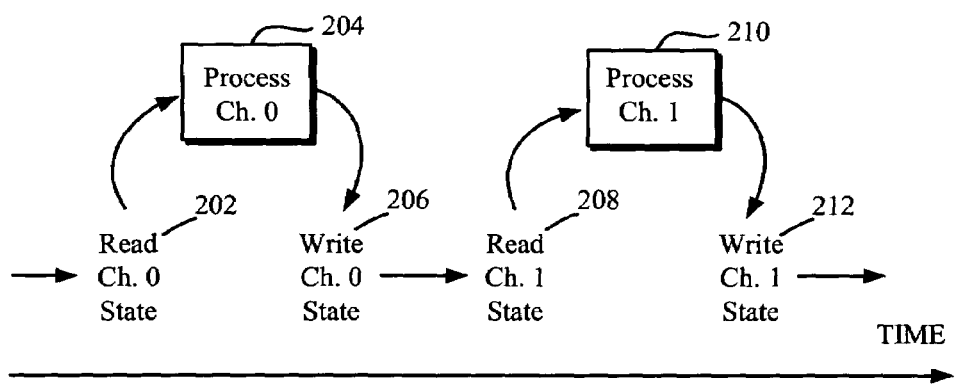
FIG. 2 illustrates a method for processing multiple HDLC channels in accordance with an embodiment of the present invention.

FIG. 2 illustrates the use of this technique to process multiple HDLC channels. Referring to FIG. 2, previously stored state information for channel 0 is retrieved from storage (step 202). This state information is used to resume processing of channel 0 where it previously left off (step 204). When a logical stopping point is reached and/or when the network processing engine wishes to process data from the next channel, the current state of channel 0 is written to memory (step 206), and the previous state of the next channel—channel 1—is retrieved (step 208). The state information for channel 1 is used to resume processing of that channel (step 210), which continues until it is once again desired to process another channel, at which point the current state information for channel 1 is stored (step 212), and the process repeats itself for the next channel. The process shown in FIG. 2 works well for both encapsulation and de-encapsulation (i.e., transmission and reception) of HDLC frames.

The approach shown in FIG. 2 can be extrapolated to any number of HDLC channels. For an arbitrary number of channels, N, the speed of the engine will need to be sufficient to match the aggregate bandwidth of all such channels, with allowance made for any dead time that occurs during the channel switching process.

The HDLC state that is read and written each time a channel switch occurs will sometimes be referred to herein as the channel context. In a preferred embodiment, the channel context includes the items listed below.

Transmission (i.e., encapsulation of data into HDLC frames):
  Frame Status Bit: Indicates whether the channel is in a frame or idling.
  Current FCS Value: The FCS is continuously calculated as processing of a frame progresses.
  Frame Terminated Bit: Indicates whether the last frame was terminated by a flag. Together with the ones count, can be used to generate the appropriate idle pattern.
  Ones Count: The count of successive ones up to the current data point.

Receipt (i.e., unpacking, or de-encapsulating, data from HDLC frames):
  Frame Status Bit.
  Valid Count: Indicates the amount of data that is required before the current received frame will be long enough to be valid. Allows the engine to drop received frames that are shorter than a predefined limit.
  Current FCS Value.
  Ones Count.

In addition, in embodiments in which the engine processes data 8 bits at a time (or a multiple thereof), a byte or word "residue" is preferably stored, representing any overflow from the byte boundary. A count is also preferably stored indicating how many bits of the residue are valid. This is especially useful when encapsulating data into HDLC frames. For example, due to the overhead associated with HDLC frames (such as that resulting from bit stuffing), the HDLC encoding engine's output will often have a larger amount of data than the raw data from which it was derived. Thus, for example, if an HDLC engine accepts 4 bytes of raw data, the HDLC-encoded output may be greater than 4 bytes. Yet downstream components, such as a network processing engine component responsible for, e.g., aggregating the HDLC data, multiplexing it into channels, and/or transmitting it over a network connection, are often designed to process data in 4 byte chunks. By storing the residue and the count, the HDLC engine will be able to pick up where it left off, without loss of data, when processing of that channel resumes. Thus, preferred embodiments of the present invention can be used on a variety of HDLC engines, including those that process data more than one bit at a time.

Thus, preferred embodiments of the present invention enable the implementation of a relatively simple channel switching mechanism that can be managed with relative ease by a host controller. In addition, preferred embodiments can be used to effectively obviate physical limitations on the number of HDLC channels that can be supported by a single network processing engine. This can be seen by comparing the systems shown in FIGS. 3 and 4.

Figure 3:
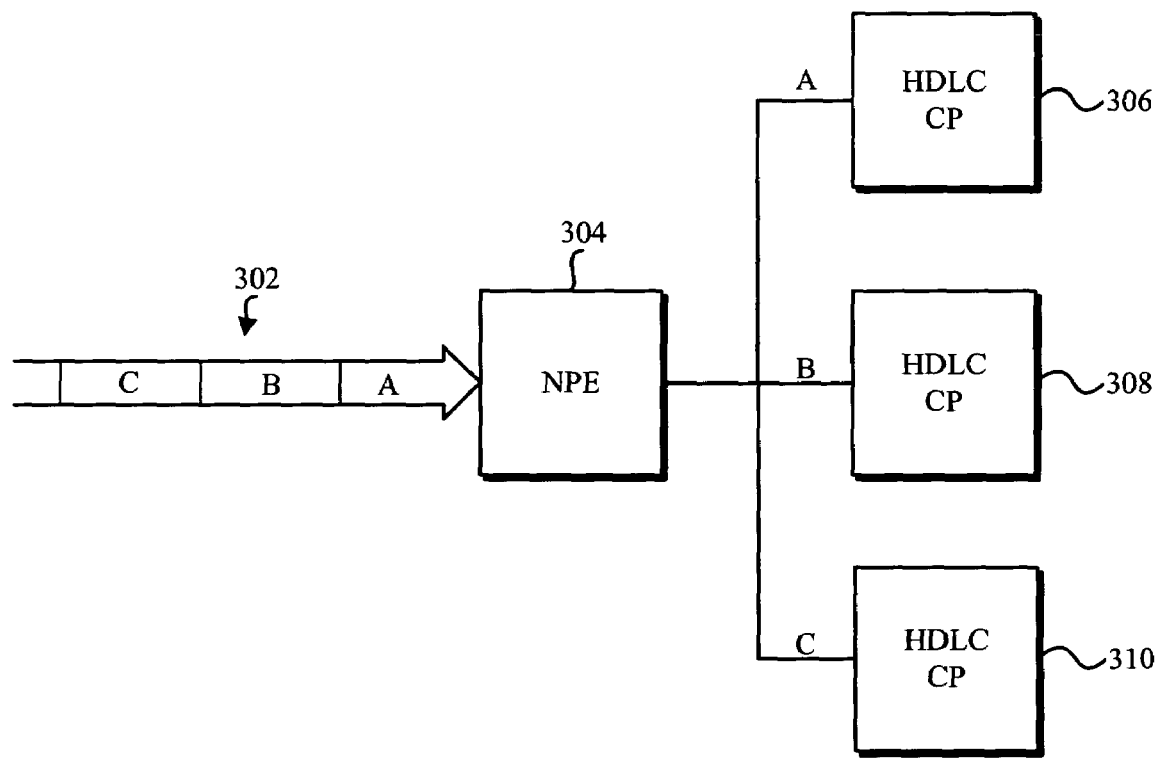
FIG. 3 illustrates the use of multiple HDLC coprocessors to process multiple HDLC channels.

FIG. 3 illustrates the conventional use of separate HDLC coprocessors (CP) to process HDLC channels. As shown in FIG. 3, a network processing engine (NPE) 304 receives multiple channels of time-division multiplexed HDLC data via a network connection 302, such as T1 line or the like. The network processing engine accumulates chunks of HDLC data for each channel, and forwards the aggregated data for each channel to a different HDLC coprocessor 306, 308, 310 for decoding (de-encapsulation). As is evident, a separate coprocessor is dedicated for processing each HDLC channel, such that multiple HDLC channels require multiple HDLC coprocessors.

Figure 4:
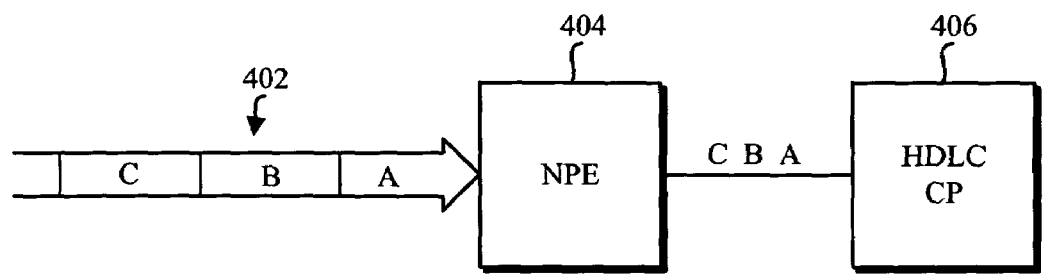
FIG. 4 illustrates the use of a single HDLC coprocessor to process multiple HDLC channels.

In accordance with preferred embodiments of the present invention, a single HDLC coprocessor can be used to process multiple HDLC channels. Such an arrangement is illustrated in FIG. 4. Referring to FIG. 4, a network processing engine 404 receives time-division multiplexed HDLC data via a T1 line or other network connection 402, as described above in connection with FIG. 3. The network processing engine aggregates the HDLC data for each channel into chunks of, e.g., 32 bits, and forwards the aggregated data for each channel to an HDLC coprocessor 406 for decoding (de-encapsulation). The HDLC coprocessor 406 uses the state storage process described above to switch between channels without loss of data. In a preferred embodiment, the same controller that reads and writes the channel state also is responsible for switching the data source and sinks for the HDLC output to direct the channel data as appropriate.

The arrangement shown in FIG. 4 can also be used to encapsulate (instead of, or in addition to, de-encapsulate) multiple channels of HDLC data. This is done by essentially reversing the flow of data described above. That is, the HDLC coprocessor 406 receives raw data, encodes the data into HDLC frames, and sends the HDLC data to the network processing engine 404 for subsequent transmission.

It will be appreciated that the arrangement shown in FIG. 4 has been simplified for the sake of clarity. For example, although network processing engine 404 and coprocessor 406 are shown as distinct elements, in some embodiments coprocessor 406 can be considered part of network processing engine 404, which, in turn, may form part of a larger network processor.

Figure 5:
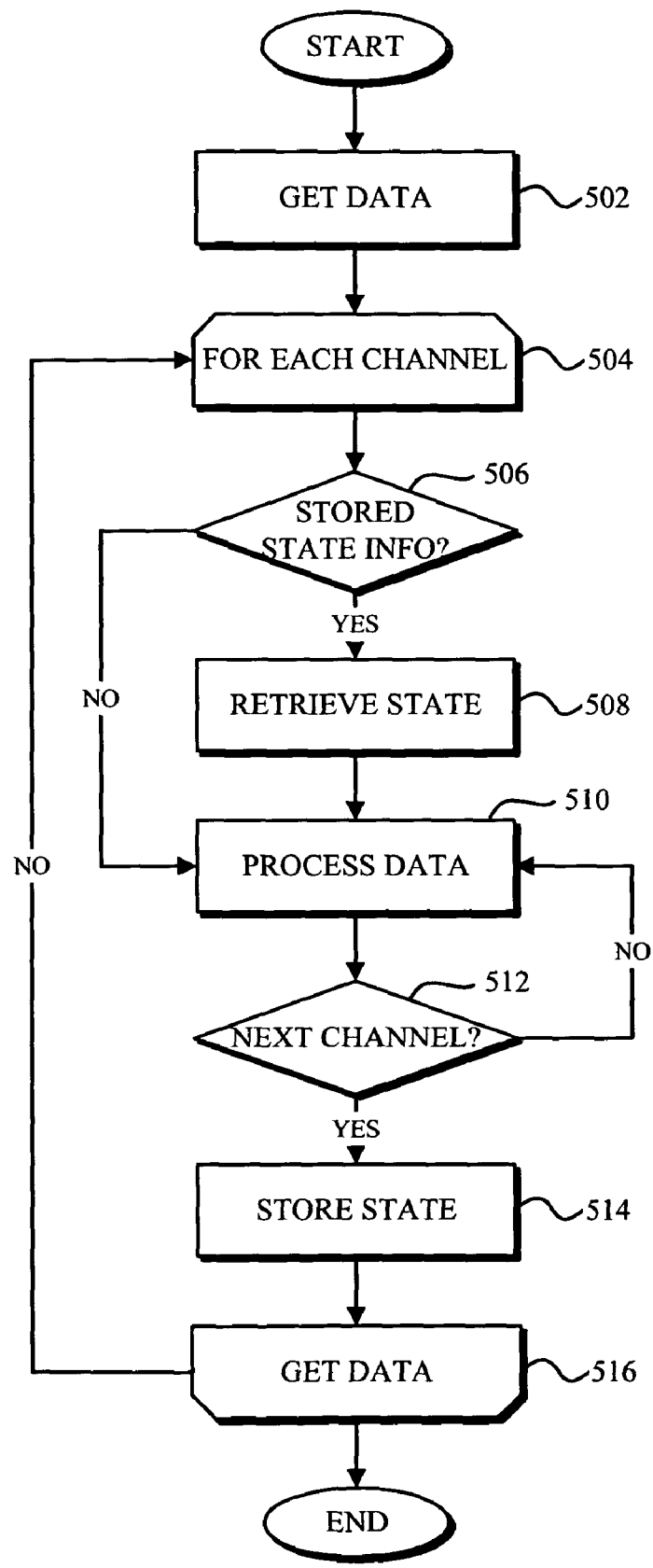
FIG. 5 is a flowchart illustrating a method for processing HDLC channels.

FIG. 5 is a flowchart illustrating a method of processing HDLC data that could be implemented, for example, in the firmware of an HDLC coprocessor such as that shown in FIG. 4. Referring to FIG. 5, the coprocessor obtains accumulated data for a given channel (steps 502, 504) from a network processing engine. The coprocessor may then make a determination as to whether state information for that channel has been previously stored (step 506). If previous state information for that channel has been stored (i.e., a "Yes" exit at step 506), then that information is retrieved (step 508) and used to process incoming data on that channel (step 510). If previous state information has not been stored for that channel (e.g., if this is the first data received on the channel), then the state information for the channel is initialized and incoming data from the channel is processed in the normal manner. Processing of a given channel continues until the network processing engine moves on to the next channel and begins sending aggregate HDLC data for the new channel to the coprocessor (i.e., a "Yes" exit at step 512). The coprocessor then stores the state of the previous/current channel (step 514), obtains the new channel's data (step 516), and repeats the process shown at steps 506-512.

It will be appreciated that numerous modifications could be made to the process shown in FIG. 5 without departing from the principles of the present invention, such as changing the order of the steps, adding or deleting steps, and/or the like. In addition, it should be understood that the process shown in FIG. 5 works well for both encapsulation and de-encapsulation of HDLC frames.

Figure 6:
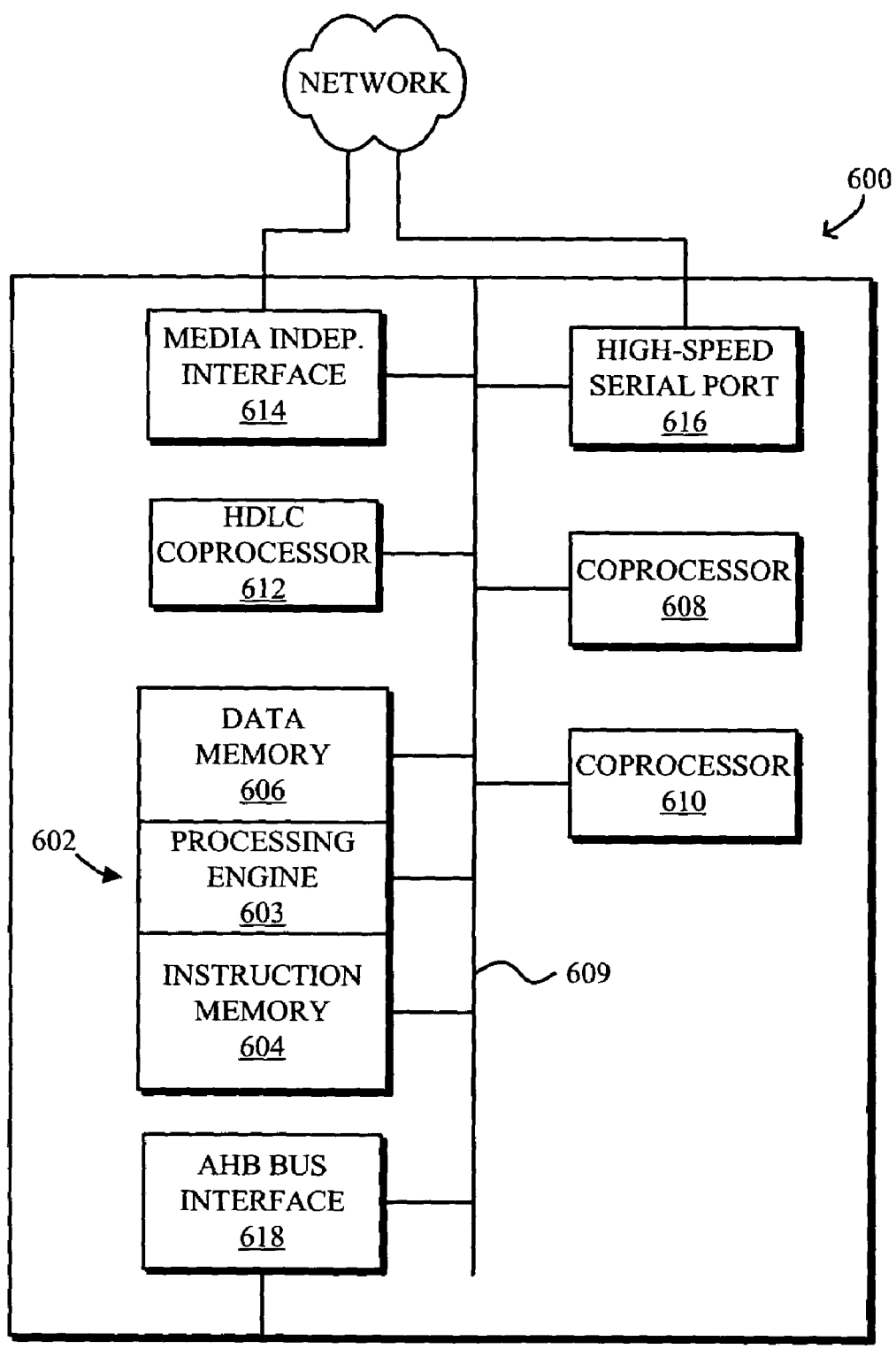
FIG. 6 illustrates a network processing engine for practicing embodiments of the present invention.

FIG. 6 illustrates a system, such as a network processing engine 600, for practicing embodiments of the present invention. Network processing engine 600 may include a processor core 602 used to accelerate the functions performed by a larger network processor that contains several such network processing engines. For example, network processing engine 600 may include functionality similar to that found in the network processing engines contained in the IXP425 network processor produced by Intel Corporation of Santa Clara, Calif.

As shown in FIG. 6, processor core 602 may, for example, comprise a multi-threaded RISC engine 603 that has self-contained instruction memory 604 and data memory 606 to enable rapid access to locally stored code and data. Network processing engine 600 may also include one or more hardware-based coprocessors 608, 610, 612 for performing one or more specialized functions-such as serialization, CRC checking, cryptography, HDLC encoding, and/or the like-that are relatively difficult to implement using core processor 602.

Network processing engine 600 will also typically include one or more interfaces 614, 616, 618 for communicating with other devices and/or networks. For example, network processing engine 600 may include an AHB bus interface 618 for communicating with other parts of a larger network processing chip, one or more high-speed serial ports 616 for communicating using serial bit stream protocols such as T1 and E1, one or more Media Independent Interfaces 614 for interfacing with, e.g., Ethernet networks, and/or the like. As shown in FIG. 6, one or more internal buses 609 are also provided to facilitate communication between the various components of the system.

In a preferred embodiment, the functionality described above in connection with FIGS. 2 and 5 is implemented by software that is executed by the HDLC coprocessor 612; however, it should be appreciated that some or all of this functionality could be implemented by other parts of the network processing engine. In addition, in a preferred embodiment the channel context (state) information is stored in memory local to the HDLC coprocessor. For example, the state information can be stored in high-speed memory contained within the HDLC coprocessor chip. Local storage of channel context information can facilitate rapid switching between channels. For example, in some embodiments the channel context information can be switched (e.g., old state saved, and next state retrieved) in a single instruction cycle. Thus, local storage of the channel context information can reduce the dead time that occurs during channel switching, thereby enabling the HDLC coprocessor to handle a greater number of channels. One of ordinary skill in the art will appreciate, however, that in other embodiments the state information can be stored elsewhere.

As previously indicated, the HDLC coprocessor is preferably operable to receive (de-encapsulate) and transmit (encapsulate) HDLC data. In addition to de-encapsulating HDLC data, the coprocessor may also detect errors in the incoming frame. For example, the HDLC coprocessor may detect FCS failures, abort sequences, and de-encapsulated frames that are not an integral number of bytes. These errors can be reported via status signals or interrupts. Similarly, in addition to encapsulating HDLC data, the coprocessor may also provide a source of idle sequences for the channel when there is no data to send.

One of ordinary skill in the art will appreciate that the systems and methods of the present invention can be practiced with devices and architectures that lack many of the components and features shown in FIG. 6, and/or that have other components or features that are not shown. For example, some systems may include different interface circuitry, a different configuration of memory, and/or a different set of coprocessors. Moreover, although FIG. 6 shows a network processing engine implemented on a single chip, in other embodiments some or all of the functionality shown in FIG. 6 could be distributed amongst multiple chips. Thus, it should be appreciated that FIG. 6 is provided for purposes of illustration and not limitation.

While preferred embodiments are described and illustrated herein, it will be appreciated that they are merely illustrative, and that modifications can be made to these embodiments without departing from the spirit and scope of the invention. Thus, the invention is intended to be defined only in terms of the following claims.

What is claimed is:

1. A method for processing HDLC data, the method comprising:
   retrieving previously stored first state information for a first HDLC channel;
   using the retrieved first state information to resume processing of the first HDLC channel;
   writing second state information for the first HDLC channel to storage;
   retrieving previously stored third state information for a second HDLC channel; and
   using the retrieved third state information to resume processing of the second HDLC channel, and
   the state information comprises: status bit, a current frame check sequence value, a count of the number of consecutive ones received in the currently received frame, and a count of the amount of data needed before a currently received frame will be long enough to be valid.

2. The method of claim 1, further comprising:
   writing fourth state information for the second HDLC channel to storage;
   retrieving the second state information; and
   using the second state information to resume processing of the first HDLC channel.

3. The method of claim 1, in which the state information further comprises an indication of whether the last frame was terminated by a flag.

4. The method of claim 1, in which the state information comprises a byte residue.

5. The method of claim 4, in which the state information further comprises a count of the number of valid bits in the byte residue.

6. The method of claim 1, performed by an HDLC coprocessor of a network processing engine.

7. The method of claim 1, in which the processing of the first and second channels comprises one of: encapsulating raw data into HDLC encoded data, or (b) de-encapsulating HDLC encoded data into raw data.

8. A network processing engine comprising:
   a processor;
   memory;
   computer code stored in said memory, which, when executed by the processor, is operable to cause the processor to perform actions comprising:
      retrieving previously stored first state information for a first HDLC channel;
      using the retrieved first state information to resume processing of the first HDLC channel;
      writing second state information for the first HDLC channel to memory;
      retrieving previously stored third state information for a second HDLC channel; and
      using the retrieved third state information to resume processing of the second HDLC channel, and the state information comprising: a residue of bits that fall outside a predefined byte boundary, and a count of the number of bits in the residue.

9. The network processing engine of claim 8, in which the state information comprises a residue of bits that fall outside a predefined byte boundary.

10. The network processing engine of claim 9, in which the state information further comprises a count of the number of valid bits in the residue.

11. The network processing engine of claim 8, in which the processor comprises an HDLC coprocessor, and the memory comprises memory contained within the HDLC coprocessor.

12. A computer readable medium embodied a computer program package, the computer program package comprising instructions that, when executed by a processor, cause the processor to perform actions comprising:
   retrieving stored first state information for a first HDLC channel;
   using the retrieved first state information to resume processing of the first HDLC channel;
   writing second state information for the first HDLC channel to storage;
   retrieving previously stored third state information for a second HDLC channel; and
   using the retrieved third state information to resume processing of the second HDLC channel, and
   the state information comprising: a residue of bits that fall outside a predefined byte boundary, and a count of the number of bits in the residue.

13. The computer readable medium of claim 12, further comprising instructions that cause the processor to perform actions comprising:
   writing fourth state information for the second HDLC channel to storage;
   retrieving the second state information; and
   using the second state information to resume processing of the first HDLC channel.

14. The computer readable medium of claim 12, in which the computer readable medium comprises a memory unit in a network processing engine, and in which the processor comprises an HDLC coprocessor in said network processing engine.

15. The computer readable medium of claim 12, in which the state information includes channel context information comprising:
   a frame status bit, a current frame check sequence value, and a count of the number of consecutive ones received in the current frame.

16. A network processing engine configured to encapsulate and de-encapsulate multiple HDLC channels at a time, and to comprise an HDLC coprocessor for locally storing state information for each HDLC channel being processed, and for retrieving the stored state information for a given HDLC channel and using the retrieved state information to resume processing of the given HDLC channel.

17. A system comprising:
   a network processing engine, the network processing engine being configured to:
      obtain multiple channels of HDLC data, the multiple channels of HDLC data being time-division multiplexed together;
      accumulate chunks of HDLC data from each channel; and
      pass the chunks of HDLC data to an HDLC coprocessor;
   an HDLC coprocessor, the HDLC coprocessor being configured to:
      obtain the chunks of HDLC data for each channel from said network processing engine; and
      de-encapsulate the chunks of HDLC data, the HDLC coprocessor is further configured to:
      obtain raw data;
      encapsulate the raw data into HDLC frames;
   and pass the encapsulated data to a component of the network processing engine for transmission over a network.

* * * * *